United States Patent [19]

Schupp et al.

[11] Patent Number: 5,096,555
[45] Date of Patent: Mar. 17, 1992

[54] HEAT-CURABLE COATING COMPOSITION FOR CATHODIC ELECTROCOATING

[75] Inventors: Hans Schupp, Worms; Thomas Schwerzel, Meckenheim; Klaus Huemke, Ludwigshafen; Dieter Faul, Bad Duerkheim, all of Fed. Rep. of Germany

[73] Assignee: BASF Aktiengesellschaft, Ludwigshafen, Fed. Rep. of Germany

[21] Appl. No.: 470,380

[22] Filed: Jan. 25, 1990

[30] Foreign Application Priority Data

Jan. 27, 1989 [DE] Fed. Rep. of Germany ....... 3902441

[51] Int. Cl.$^5$ .................. C25D 13/00; C08G 59/14; C08L 63/00
[52] U.S. Cl. .................. 204/181.7; 523/415; 523/417; 525/528
[58] Field of Search ............ 523/415, 417; 525/528; 204/181.7

[56] References Cited

U.S. PATENT DOCUMENTS

| | | | |
|---|---|---|---|
| 4,086,292 | 4/1978 | Kempter et al. | 204/181.7 |
| 4,246,151 | 1/1981 | Dohy et al. | 523/415 |
| 4,260,697 | 4/1981 | Kempter et al. | 525/484 |
| 4,338,235 | 7/1982 | Hazan | 204/181.7 |
| 4,557,814 | 12/1985 | Schupp et al. | 523/415 |
| 4,576,979 | 3/1986 | Schupp et al. | 523/415 |
| 4,624,974 | 11/1986 | Geist et al. | 204/181.7 |
| 4,711,934 | 12/1987 | Paar et al. | 523/415 |
| 4,757,113 | 7/1988 | Paar et al. | 528/45 |
| 4,824,927 | 4/1989 | Dobbelstein et al. | 523/415 |
| 4,830,722 | 5/1989 | Dobbelstein et al. | 204/181.7 |
| 4,837,291 | 6/1989 | Paar | 528/45 |
| 4,851,486 | 7/1989 | Paar | 523/415 |
| 4,879,013 | 11/1989 | Austin | 204/181.7 |
| 4,939,216 | 7/1990 | Lawrenz et al. | 523/415 |

*Primary Examiner*—John Niebling
*Assistant Examiner*—Steven P. Marquis
*Attorney, Agent, or Firm*—Keil & Weinkauf

[57] ABSTRACT

A heat-curable, cathodically depositable aqueous electrocoating composition contains
(A) from 50 to 95% by weight of a polymerization or polycondensation or polyaddition product which has an average molecular weight of from 200 to 20,000 and primary and/or secondary hydroxyl groups and primary, secondary and/or tertiary amino groups and is water-thinnable on protonation with an acid, and
(B) from 5 to 50% by weight of a water-thinnable crosslinking agent having cationic groups or groups which are convertible into cationic groups by protonation with an acid.

11 Claims, No Drawings

HEAT-CURABLE COATING COMPOSITION FOR CATHODIC ELECTROCOATING

The present invention relates to a cathodic electrocoating composition which contains an organic synthetic resin component which becomes water-thinnable on protonation with an acid, a water-thinnable crosslinking agent, optional pigments, fillers and coating auxiliaries, and in an amount of up to 20% by weight, based on the total weight of the coating composition, an organic solvent.

Most of the present-day electrocoating compositions of high throwing power and good corrosion protection comprise amino-epoxy resins as described for example in DE-A-3,422,457, DE-A-3,325,061 and DE-A-3,444,110. This epoxy resin is usually admixed with a crosslinking agent in organic solution, and the mixture is then protonated and dispersed in water. After deposition on metal the binder is thermally crosslinked by baking at from 160° to 200° C.

A disadvantage of this technique of preparing an electrocoating composition lies in the strictness of conditions which must be adhered to. The binder is customarily prepared at elevated temperature, in general at up to 120° C., and is mixed immediately thereafter, as it cools down but while still hot, with the crosslinking agent before being dispersed in water. Consequently, there is a danger of a premature reaction between the binder and the crosslinking agent, in particular if, owing to production difficulties, the mixture is kept in the reactor at for example 50°-70° C. for a prolonged period. For this reason, the binder is cooled down to such an extent that such a reaction takes place only to a minor extent. However, this means a very long cooling-down period in practice. Furthermore, the time between the mixing and the dispersing is kept to a minimum, but again this is not always possible for production reasons, so that in practice there may be variations from batch to batch.

A further disadvantage of the abovementioned technique is the limited scope for varying the electrocoating composition. The amount of crosslinking agent has a bearing for example or such important properties of the film as crosslinking density, hardness and brittleness of the baked coat, solvent resistance and corrosion resistance, to name but a few. Similarly, the nature of the crosslinking agent has a bearing on many properties. However, the addition of a crosslinking agent to the binder prior to dispersing fixes the mixing ratio and the nature of the crosslinking agent from the start. If any ingredient or mixing ratio is to be changed, it is necessary to start again from scratch.

A further constraint on the abovementioned procedure concerns the baking temperatures. Baking temperatures within the range from 160° to 200° C. are unfavorable in principle. For a start, the energy requirements are very high at such high temperatures, since the entire car body must be heated to this temperature. In addition, most crosslinking agents based on aromatic isocyanates, in particular on toluylene diisocyanate, are very prone to yellowing at such temperatures, and the danger is that this yellowing will also be visible in the topcoat. Furthermore, car bodies increasingly incorporate plastics components whose dimensional stability is no longer ensured at such high temperatures.

There has therefore been no shortage of attempts to lower the baking temperature of electrocoatings. EP-A-208,867 and EP-A-220,440 propose for this purpose isocyanate type crosslinking agents whose isocyanate groups are blocked via malonic ester groups. Malonic ester groups are known blocking groups of low-bake characteristics, baking temperatures down to 120° C. being obtainable therewith. In U.S. Pat. No. 4,659,770, an acrylate binder which contains primary amino groups is mixed in organic solution with a crosslinking agent comprising an aliphatic isocyanate whose isocyanate groups are blocked with ketoxime or malonic ester. Curing takes place at 60° -90° C. It is true that all these systems show low-bake characteristics, but their storage life is limited. It is especially in electrocoating, where the aqueous dispersion is stirred at about 30° C. for weeks during which no premature reaction must take place, that such combinations are unusable.

DE-A-3,630,667 describes a process which avoids the abovementioned disadvantages. In this process, first a binder is applied by electrocoating and then a free isocyanate is applied from organic solution as a separate crosslinking agent. This process is uneconomical and impracticable. For a start, large amounts of solvent are required for applying the crosslinking agent, for another an advantage of electrocoating is precisely that cavities and other areas not reachable by conventional application techniques can be covered. However, the crosslinking agent is unable to penetrate into these areas, so that curing cannot take place there.

There is therefore a demand for a process for preparing electrocoating compositions which are stable to storage at 30° C. but are curable at relatively low temperatures, for example at 120°-140° C.

Water-soluble or water-dispersible blocked isocyanates are known. For instance, U.S. Pat. No. 4,098,933 describes water-soluble or water-dispersible blocked isocyanates obtained by reaction of isocyanates with compounds containing carboxyl groups, sulfonic acid groups, tertiary amines, quaternary ammonium groups or polyalkylene oxides. These water-soluble or water-dispersible blocked isocyanates are used in aqueous solution together with organic compounds having at least two hydrogen atoms reactive towards isocyanate for manufacturing sheetlike materials. There is no mention here that these isocyanates would be suitable for use as crosslinking agents for the binders in cathodic electrocoating compositions.

It is an object of the present invention to develop electrocoating baths which are stable to storage over weeks but which, after deposition, are capable of curing at low temperatures within a short time. It is another object of the present invention to develop a process which is more reliable than existing processes and helps to avoid faulty batches. It is a further object of the present invention to provide a process which permits variations in the makeup of the electrocoating composition in the ready-produced bath.

We have found that these objects are achieved by a heat-curable, cathodically depositable aqueous electrocoating composition containing (A) from 50 to 95% by weight of a polymerization or polycondensation or polyaddition product which has an average molecular weight of from 200 to 20,000 and primary and/or secondary hydroxyl groups and primary, secondary and/or tertiary amino groups and is water-thinnable on protonation with an acid, and (B) from 5 to 50% by weight of a water-thinnable crosslinking agent having cationic groups or groups which are convertible into cationic groups by protonation with an acid.

There now follow detailed observations concerning the formative components of the coating composition:

Component (A) can be any art recognized synthetic resin binder which contains primary and/or secondary hydroxyl groups and primary, secondary and/or tertiary amino groups and has an average molecular weight of from 200 to 20,000, such as an aminoepoxy resin, aminopoly(meth)acrylate resin or aminopolyurethane resin having an amine number of from 30 to 150. The use of aminoepoxy resins is preferred for basecoats intended to confer a high level of corrosion protection. The synthetic resin binder contains at least one amino group per molecule. The lower limit of the amine number should be 45, preferably 70, and the upper limit should be 120, preferably 100. Examples of aminoepoxy resins are reaction product of epoxy-containing resins having preferably terminal epoxy groups with saturated and/or unsaturated secondary and/or primary amines or aminoalcohols. These reaction products can be modified at the alkyl moiety by at least one primary and/or secondary hydroxyl group, by a mono- or dialkylamino group and/or by a primary amino group which is at least temporarily protected by ketiminization.

The epoxy resins used can be any desired materials provided they have an average molecular weight of from 300 to 6000 and contain on average from 1.0 to 3.0 epoxy groups per molecule, preferably compounds having two epoxy groups per molecule. Preference is given to epoxy resins having average molecular weights of from 350 to 5000, in particular from 350 to 2000. Particularly preferred epoxy resins are for example glycidyl ethers of polyphenols which on average contain at least two phenolic hydroxyl groups in the molecule and which are preparable in a conventional manner by etherification with an epihalohydrin in the presence of alkali. Aromatic polyepoxies having a higher epoxy equivalent weight can be prepared from those having a lower epoxy equivalent weight and polyphenols.

The amino groups can be introduced in a conventional reaction as known to those skilled in the art and as described for example in EP 134,983, EP 165,556 and EP 166,314.

Component (A) is used in an amount of from 50 to 95% by weight, preferably from 60 to 80% by weight, based on the total amount of components (A) and (B).

Suitable starting compounds for preparing the crosslinking agent (B) are for example amino resins such as urea-formaldehyde resins, melamine resins or benzoguanamine resins, blocked isocyanate type crosslinking agents, crosslinking agents which cure by esteraminolysis and/or transesterification, eg. β-hydroxyalkyl ester type crosslinking agents as described in EP 40,867 and carbalkoxymethyl ester type crosslinking agents as described in DE 3,233,139. Further possible crosslinking agents are phenolic Mannich bases as described for example in DE 3,422,457.

These crosslinking agents, however, cannot be used unmodified, since they are not dispersible themselves. For this reason, suitable modifying groups must be incorporated to ensure dispersibility. Such groups are for example tertiary amino groups via which, following protonation with an acid, a crosslinking agent becomes water-dispersible. It is also possible to use quaternary ammonium groups to ensure dispersibility.

Further possible groups are compounds having quaternary phosphonium groups and tertiary sulfonium groups.

The tertiary amino groups or quaternary ammonium groups can be incorporated in various ways. It is possible to start for example from polyols which contain tertiary amino groups, and react these polyols with half-blocked diisocyanates. Equally, the converse procedure is possible, namely to react a diisocyanate with a polyol which contains tertiary amino groups by essentially reacting only one isocyanate group per molecule and subsequently blocking the second isocyanate group. Suitable polyols having tertiary amino groups are for example: trishydroxyalkylamines such as triethanolamine, reaction products of amines with epoxies or alkyl halides. A further possibility is the partial replacement of the isocyanate type blocking agent for compounds which contain tertiary amino groups. For instance, in a commercial crosslinking agent formed from a polyol and diisocyanate, from 50 to 90% of the free isocyanate groups can be blocked. The remaining isocyanate groups are then reacted with an alcohol or amine which contains tertiary amino groups. Suitable for this purpose are for example dimethylaminopropylamine and dimethylaminopropanol. Diisocyanates which have been half-reacted with dimethylaminopropylamine or dimethylaminopropanol are also suitable for modifying OH-containing crosslinking agents such as, for example, phenolic Mannich bases in which some of the phenol groups can be converted by these isocyanates. Quaternary ammonium groups can be prepared by reacting tertiary amines with alkyl halides or with epoxies. For instance, Epikote ® 828 (from SHELL) can be reacted with two moles of methyldiethanolamine to obtain a hydroxyl-containing polyol suitable for the conversion of isocyanates.

It is also possible to block polyisocyanates with epoxide-containing compounds and to quaternize the remaining epoxy groups with free tertiary amines.

To incorporate phosphonium structures, it is possible to start from phosphine-containing isocyanates which are converted to phosphonium groups in a conventional manner. The preference here is for the reaction with monoepoxies. This reaction can be carried out by first reacting a hydroxyl-containing phosphine with isocyanates and then quaternizing with monoepoxy; it is preferable, however, to react the isocyanate with an epoxy-containing compound and then with free phosphine. Suitable phosphines are for example trialkylphosphines such as triethylphosphine, tributylphosphine and trioctylphosphine, triarylphosphines, for example triphenylphosphine, alkylarylphosphines and the like. Suitable hydroxyl-containing phosphine is for example trishydroxyethylphosphine.

The preparation of sulfonium-containing isocyanates can be carried out in a similar manner. Hydroxyl-containing sulfides can be reacted with isocyanates and then converted into the sulfonium salt in a conventional manner as described for example in Houben-Weyl, vol. E11 (part 1), pp. 341-502. Furthermore, epoxy-containing isocyanates can be reacted with free sulfides. Suitable sulfides are dialkyl sulfides such as diethyl sulfide, dibutyl sulfide and higher sulfides, diaryl sulfides such as diphenyl sulfide, hydroxyl-containing sulfides such as ethylmercaptoethanol or thiodiglycol, etc.

In general, it is sufficient to modify only 10-50%, preferably only 20-45%, of all crosslinking agent molecules to ensure adequate dispersibility.

Although the use of the novel crosslinking agents according to the present invention in the form of a dispersion is preferred, they can also be used in a conventional form. Thus, the crosslinking agents according to the present invention can be mixed with the binder in organic solution, partly neutralized and then dispersed. Here too the crosslinking agents according to the present invention offer some advantages. Dispersions containing aromatic crosslinking agents tend to form a sediment of particles separated from the bath. Use of the crosslinking agents according to the present invention substantially reduces or completely eliminates any sedimentation tendency. Furthermore, less solvent is necessary in general to obtain the desired flow properties and the necessary layer thickness.

As well as the abovementioned components it is possible to add further substances such as pigments, auxiliaries, solvents and curing catalysts. The coating compositions thus prepared can also be applied to substrates such as wood, plastic or metal by conventional methods. For use in cathodic electrocoating, the synthetic resin is converted in the presence of additives mentioned into a water-soluble form by protonation with an acid. The acid used is preferably a carboxylic acid such as formic acid, acetic acid or lactic acid, although an inorganic acid, for example a phosphoric acid, can also be used. This dispersion is then mixed with a dispersion of the crosslinking agent added in the desired ratio. It is of course also possible to add the additives mentioned to the crosslinking agent and then to disperse the mixture.

For cathodic electrocoating, the solids content of the electrocoating bath is in general set to 5–30% by weight.

Deposition customarily takes place at from 15° to 40° C. in the course of from 0.5 to 5 minutes and at a pH of from 4.0 to 8.5, preferably a neutral pH, at a voltage of 50 to 500 V. In cathodic electrocoating, the electrically conducting object to be coated is connected as the cathode. The deposited film is cured at above 100° C. in one course or about 20 minutes.

EXAMPLES

Synthetic resin binder dispersion

In a vessel equipped with a water separator and a packed column, 12,440 g of hexamethylenediamine, 18,660 g of dimeric fatty acid (Pripol® 1013, from Unichema), 3,000 g of linseed oil fatty acid and 2,566 g of xylene were made to react. 1,150 g of water and 1,750 g of xylene were distilled off in the course of 3–4 hours. The product had an amine number of 233 mg of KOH/g.

In a reaction vessel, 815 g of a diglycidyl ether of bis(4-hydroxyphenyl)-2,2-propane (bisphenol A) and epichlorohydrin having an equivalent weight of 188, 214.4 g of bisphenol A and 53.6 g of propylene glycol monophenyl ether were made to react by means of 0.26 g of triphenylphosphine. 3 hours' reaction at 130° C. gave a product having an epoxy equivalent weight of 429. It was diluted with 302 g of isobutanol and 212.4 g of toluene and cooled to 60° C. 70.8 g of methylethanolamine and 351.6 g of the abovementioned intermediate were then added, the mixture was heated to 80° C. 2 hours later, epoxy was no longer detectable. The synthetic resin had an amine number of 105 mg of KOH/g, a solids content of 70% by weight and a plate/cone viscosity of 4,000 mPas at 75° C.

137 g of the abovementioned synthetic resin binder were treated with 3.1 g of acetic acid. Deionized water was then added with stirring to obtain a 35% strength by weight dispersion.

Pigment paste 640 g of a diglycidyl ether based on bisphenol A and epichlorohydrin having an epoxy equivalent weight of 485 and 160 g of such a diglycidyl ether having an epoxy equivalent weight of 189 were mixed at 100° C. A further vessel was charged with 452 g of hexamethylenediamine, the contents heated to 100° C., and 720 g of the above hot epoxy resin mixture were added in the course of an hour during which slight cooling had to be applied in order to keep the temperature at 100° C. After a further 30 minutes, the excess hexamethylenediamine was taken off by increasing the temperature and reducing the pressure, the final temperature being 205° C. and the final pressure 30 mbar. 57.6 g of stearic acid, 172.7 g of dimeric fatty acid and 115 g of xylene were then added. The water formed was distilled off azeotropically at 175°–180° C. in the course of 90 minutes. 58 g of butylglycol and 322 g of isobutanol were then added. The product had a solids content of 70% by weight and a viscosity, measured at 75° C. using a plate/cone viscometer, of 2,240 mPas.

110 g of the synthetic resin thus obtained were ball-milled together with 36 g of ethylene glycol monobutyl ether, 3 g of acetic acid, 170 g of titanium dioxide, 18 g of lead silicate, 4.5 g of carbon black and 170 g of water until the particle size was <7 μm.

Crosslinking agent 1

A reaction vessel was charged with 263.4 g of toluylene diisocyanate, 85.2 g of toluene, 85.2 g of methyl isobutyl ketone and 0.15 g of dibutyltin dilaurate. 67 g of trimethylolpropane in 57 g of 1:1 toluene/methyl isobutyl ketone were then added dropwise in the course of an hour, the mixture was stirred at 20°–25° C. for 1 hour. Thereafter a mixture of 108.7 g of methyl ethyl ketoxime and 25.6 g of dimethylaminopropylamine was added, and the contents were stirred at 30°–40° C.

Crosslinking agent 2

The procedure was as for crosslinking agent 1, except that the stated amount of blocking agent was changed to 117.5 g of methyl ethyl ketoxime and 15.3 g of dimethylaminopropylamine.

Crosslinking agent 3

The procedure was as for crosslinking agent 1, except that the methyl ethyl ketoxime was replaced by 143.75 g of methyl isobutyl ketoxime.

Crosslinking agent 4

A reaction vessel was charged with 333.3 g of isophorone diisocyanate, 185 g of toluene, 185 g of methyl ethyl ketone and 0.15 g of dibutyltin dilaurate. 67 g of trimethylolpropane and 64 g of 1:1 toluene/methyl ethyl ketone were added dropwise in the course of an hour, and the contents were subsequently stirred at 20° C. for one hour. Thereafter a mixture of 152.8 g of 2,6-dimethylpiperidine and 15.33 g of dimethylaminopropylamine was added, and the contents were subsequently stirred until the isocyanate value had dropped to zero.

Crosslinking agent 5

The procedure was as for crosslinking agent 3, except that the dimethylaminopropylamine was replaced by 25.8 g of dimethylaminopropanol.

Crosslinking agent 6

The procedure was as for crosslinking agent 1, except that the blocking agent used this time was 142.1 g of dibutylamine and 40.9 g of dimethylaminopropylamine.

Crosslinking agent 7

152 g of bisphenol A, 63 g of a diglycidyl ether of bisphenol A having ar epoxy equivalent weight of 189 and 0.1 g of tributylphosphine were heated at 160° C. for 1 hour Epoxy was then no longer detectable, a chain-advanced diphenol having been formed. It was admixed with 53.8 g of isopropanol, 129 g of di-n-butylamine, 31.5 g of paraformaldehyde and 17.6 g of isobutanol, the mixture was heated at 80° C. for 2 hours. The product had a solids content of 80% by weight.

A reaction vessel was charged with 222.2 g of isophorone diisocyanate, 94.1 g of toluene and 40.5 g of methyl isobutyl ketone 102.2 g of dimethylaminopropylamine were added at 20° to 25° C., and the contents were subsequently stirred for 30 minutes.

143 g of this product were added to 509 g of the phenolic Mannich type crosslinking agent prepared in stage 1. Stirring was continued at 50° C. until the isocyanate value had dropped to zero.

Crosslinking agent 8

A reaction vessel was charged with 222.2 g of isophorone diisocyanate, 94.1 g of toluene and 40.5 g of methyl isobutyl ketone. 103.2 g of dimethylaminopropanol were added at 20°-25° C., and the contents were subsequently stirred for 30 minutes.

143 g of this product were added to 509 g of the phenolic Mannich type crosslinking agent prepared in stage 1 of crosslinking agent 8. Stirring was continued at 50° C. until the isocyanate value had dropped to zero.

Crosslinking agent 9

A reaction vessel was charged with 174 g of toluylene diisocyanate, 94.1 g of toluene and 40.5 g of methyl isobutyl ketone. 103.2 g of dimethylaminopropanol were added at 20°-25° C., and the contents were subsequently stirred for 30 minutes.

124 g of this product were added to 509 g of the phenolic Mannich type crosslinking agent prepared in stage 1 of crosslinking agent 8. Stirring was continued at 50° C. until the isocyanate value had dropped to zero.

Crosslinking agent 10

A reaction vessel was charged with 375 g of diphenylmethane diisocyanate, 76 g of trimethylolpropane and 465 g of ethylglycol acetate. The contents were stirred at 50° C. until the NCO content had dropped to the theoretical value. Thereafter 168 g of dibutylamine and 20.6 g of dimethylaminopropanol were added, and the contents were stirred at 50° C. for 2 hours. Thereafter a mixture of 9 g of glacial acetic acid, 27 g of water and 12.2 g of glycide was added, and 60° C. was maintained for 3 hours.

Crosslinking agent 11

A reaction vessel was charged with 375 g of diphenylmethane diisocyanate, 76 g of trimethylolpropane and 300 g of ethylglycol acetate. The contents were stirred at 60° C. until the NCO content had dropped to the theoretical value. Thereafter 174.4 g of dibutylamine and 16 g of ethylthioethanol were added at 60° C., and the contents were stirred for 2 hours. After 166 g of butylglycol, 6 g of glacial acetic acid, 18 g of water and 11.1 g of glycide had been added, the contents were stirred at 60° C. for a further 3 hours.

Crosslinking agent 12

A reaction vessel was charged with 86 g of phenyl glycide ether in 100 g of isopropanol, followed at 70° C. by a mixture of 61 g of thiodiglycol, 30 g of glacial acetic acid and 18 g of water. The contents were stirred at 70° C. for 4 hours. This solution was added to 812 g of a 70% strength by weight solution of a diphenylmethane diisocyanate which had been half-blocked with dibutylamine, and the contents were stirred at 60° C. for 4 hours.

Crosslinking agent 13

A reaction vessel was charged with 375 g of diphenylmethane diisocyanate, 76 g of trimethylolpropane and 166 g of ethylglycol acetate. Stirring was continued at 50° C. until the NCO content had dropped to the theoretical value. Thereafter 155 g of dibutylamine were added, and the contents were subsequently stirred for 30 minutes 22.2 g of glycide were then added, and the contents were stirred at 50° C. for 3 hours.

This intermediate was then mixed with 60.6 g of tributyl phosphine, 18 g of glacial acetic acid and 54 g of water, and the contents were stirred at 50° C. for 2 hours.

Crosslinking agent 14

The intermediate for crosslinking agent 13 was used, but it was mixed with 30.3 g of triethylamine, 18 g of glacial acetic acid and 36 g of water.

Crosslinking agent 15

The intermediate for crosslinking agent 13 was used, but it was mixed with 38.3 g of thiodiglycol, 108 g of water and 18 g of glacial acetic acid.

Crosslinking agent dispersion 1

686.7 g of crosslinking agent 1, having a solids content of 60% by weight, were treated with 8.1 g of acetic acid. Thereafter 505.5 g of water were added a little at a time with stirring. A mixture of 300 g of solvent/water was then distilled off under reduced pressure at 40°-50° C. while 300 g of water were added. The result obtained was a finely divided, stable dispersion.

Crosslinking agent dispersion 2

The procedure was as for dispersion 1, but 6.3 g of acetic acid were used.

Crosslinking agent dispersion 3

The procedure was as for dispersion 1, again affording a stable, finely divided dispersion.

Crosslinking agent dispersion 4

343.3 g of crosslinking agent 4, having a solids content of 60% by weight, were treated with 4.74 g of acetic acid. Thereafter 245.2 g of water were added a little at a time with stirring. The result obtained was a finely divided dispersion.

Crosslinking agent dispersion 5

The procedure was as for dispersion 4, except that 5.3 g of acetic acid were added.

Crosslinking agent dispersion 6

The procedure was as for dispersion 1, likewise affording a stable, finely divided dispersion.

Crosslinking agent dispersion 7

294 g of crosslinking agent 7, having a solids content of 70% by weight, were mixed with 29.4 g of isobutanol. Thereafter 7.4 g of acetic acid were added, and the mixture was dispersed with 265 g of water by stirring. Thereafter, while 100 g of water were added, a mixture of solvent and water (200 g) was distilled off under reduced pressure. The result obtained was a finely divided stable, readily filterable dispersion.

Crosslinking agent dispersion 8

The procedure was as for crosslinking agent dispersion 7, except that crosslinking agent 8 was used.

Crosslinking agent dispersion 9

294 g of crosslinking agent 9, having a solids content of 70% by weight, were mixed with 60 g of isobutanol. 4.5 g of glacial acetic acid were added, and the mixture was dispersed with 265 g of water while stirring. The result obtained was a finely divided, stable dispersion.

Crosslinking agent dispersion 10

1,130 g of crosslinking agent 10 were mixed with 56 g of butylglycol and dispersed in 894 g of water. Thereafter 400 g of solvent/water mixture were distilled off under reduced pressure.

Electrocoating bath 1

1,061.7 g of the binder dispersion, 775 g of the pigment paste and 926 g of crosslinking agent dispersion 4 were mixed and made up with water to a solids content of 20% by weight. Deposition at 300 V produced a coat 20 μm in thickness. The coat was crosslinkable at a baking temperature of 140° C.

Electrocoating bath 2

The coating bath was made up in the same way as coating bath 1, except that crosslinking agent dispersion 2 was used. Following the addition of 30 g of Napsol ® PPH (from SHELL) and aging for 7 days a deposition voltage of 300 V produced coats from 23 to 25 μm in thickness. The deposited films were resistant to acetone after baking at 120° C., showed excellent leveling and conferred outstanding corrosion protection.

Electrocoating bath 3

The procedure was as for electrocoating bath 1 using the following ingredients:
1,061.7 g of synthetic resin binder dispersion
775 g of pigment paste
902 g of crosslinking agent dispersion 1.
30 g/l of Napsol were added to the bath. After aging for 7 days, deposition at 320 V produced a coat 18 μm in thickness.
After baking at 120° C. for 20 minutes the film was solvent-resistant, showed good leveling and conferred outstanding corrosion protection. The bath was stable over weeks, even then being free of sediment or coagulum.

Electrocoating bath 4

The procedure was as for coating bath 3, except that crosslinking agent dispersion 2 was used. After aging, deposition at 350 V gave a coat 19 μm in thickness. After curing at 120° C. the film showed satisfactory leveling and solvent resistance.

Electrocoating bath 5

1,370 g of synthetic resin binder dispersion, 775 g of pigment paste and 595 g of crosslinking agent dispersion 8 were used to prepare a bath as described under coating bath 1. Following addition of 20 g of Napsol PPH per 1 and aging for 7 days a deposition voltage of 280 V gave a coat 22 μm in thickness which was solvent-resistant on baking at 140° C. The properties of the bath were unchanged after 4 weeks' aging.

Electrocoating bath 6

Crosslinking agent dispersion 9 was used to prepare a bath as described under coating bath 5. Following addition of 25 g/l of Napsol PPH and aging for 7 days a deposition voltage of 300 V gave a coat of 23 μm thickness which become solvent-resistant on baking at 140° C. After a further 4 weeks' aging, the bath was free of sediment or coagulum, and any films deposited therefrom were unchanged compared with the first deposited film.

We claim:

1. A heat-curable, cathodically depositable aqueous electrocoating composition, obtained by separately dispersing
   (A) from 50 to 95% by weight of a polymerization or polycondensation or polyaddition product which has an average molecular weight of from 200 to 20,000 and primary and/or secondary hydroxyl groups and primary, secondary and/or tertiary amino groups and is water-thinnable on protonation with an acid, and
   (B) from 5 to 50% by weight of a water-thinnable crosslinking agent having cationic groups or groups which are convertible into cationic groups by protonation with an acid, the total amount of (A) and (B) being 100%,
in water and mixing these dispersions.

2. A coating composition as defined in claim 1, containing an aminoepoxy resin as component (A).

3. A coating composition as claimed in claim 1, containing a blocked polyisocyanate as crosslinking agent (B).

4. A coating composition as defined in claim 1, containing a phenolic Mannich base as crosslinking agent (B).

5. A coating composition as defined in claim 1, containing a crosslinking agent having tertiary amino groups or quaternary ammonium groups as component (B).

6. A coating composition as defined in claim 1, containing a crosslinking agent having phosphonium or sulfonium groups as component (B).

7. A coating composition as defined in claim 1, containing in addition an organic solvent in an amount of up to 20% by weight based on the total weight of the coating composition.

8. A coating composition as defined in claim 1, containing in addition pigments, fillers and auxiliaries.

9. A coating composition as defined in claim 1, containing as component (A) an aminoepoxy resin derived from glycidylethers of polyphenols.

10. A process for producing a cathodic electrocoating on a metal object which comprises applying by a cathodic electrocoating process to the object the composition defined in claim 1.

11. In a process for the preparation of a heat-curable, cathodically depositable aqueous electrocoating composition, containing
   (A) from 50 to 95% by weight of a polymerization or polyaddition product which has an average molecular weight of from 200 to 20,000 and primary and/or secondary hydroxyl groups and primary, secondary and/or tertiary amino groups and is water-thinnable on protonation with an acid, and
   (B) from 5 to 50% by weight of a water-thinnable crosslinking agent having cationic groups or groups which are convertible into cationic groups by protonation with an acid, the improvement which comprises: separately dispersing components (A) and (B) in water and thereafter mixing these dispersion.

* * * * *